United States Patent
Thompson

(10) Patent No.: US 11,159,494 B2
(45) Date of Patent: Oct. 26, 2021

(54) STREAMING ONE TIME PAD VIRTUAL PRIVATE NETWORK

(71) Applicant: Introspective Power, Inc., Broomfield, CO (US)

(72) Inventor: Anthony Scott Thompson, Broomfield, CO (US)

(73) Assignee: Introspective Power, Inc., Broomfield, CO (US)

( * ) Notice: Subject to any disclaimer, the term of this patent is extended or adjusted under 35 U.S.C. 154(b) by 52 days.

(21) Appl. No.: 16/429,717

(22) Filed: Jun. 3, 2019

(65) Prior Publication Data

US 2019/0342267 A1    Nov. 7, 2019

Related U.S. Application Data

(60) Division of application No. 15/445,132, filed on Feb. 28, 2017, now Pat. No. 10,348,688, which is a continuation-in-part of application No. 14/692,841, filed on Apr. 22, 2015, now Pat. No. 9,584,488, which is a continuation-in-part of application No. 14/107,158, filed on Dec. 16, 2013, now Pat. No. 9,584,313, application No. 15/445,132, which is a continuation-in-part of application No. 14/107,158, filed on Dec. 16, 2013, now Pat. No. 9,584,313, application No. 15/445,132, which is a continuation-in-part of application No. 15/409,151, filed on Jan. 18, 2017, now Pat. No. 10,057,052, which is a continuation of application No. 14/107,158, filed on Dec. 16, 2013, now Pat. No. 9,584,313, application No. 15/445,132, which is a continuation-in-part of application No. 15/411,618, filed on Jan. 20, 2017, now Pat. No. 9,825,922, which is a continuation of application No. 14/692,841, filed on Apr. 22, 2015, now Pat. No. 9,584,488, which is (Continued)

(51) Int. Cl.
| | |
|---|---|
| *H04L 29/06* | (2006.01) |
| *H04L 29/08* | (2006.01) |
| *H04L 9/06* | (2006.01) |

(52) U.S. Cl.
CPC ........ *H04L 63/0428* (2013.01); *H04L 9/0656* (2013.01); *H04L 63/029* (2013.01); *H04L 63/0272* (2013.01); *H04L 63/067* (2013.01); *H04L 67/02* (2013.01)

(58) Field of Classification Search
CPC .............. H04L 63/0428; H04L 9/0656; H04L 63/0272; H04L 63/029; H04L 63/067
See application file for complete search history.

(56) References Cited

U.S. PATENT DOCUMENTS 6,366,654 B1 *  4/2002  Cramer ............. H04L 29/06027
                                                              379/90.01
6,510,135 B1 *  1/2003  Almulhem ............. H04L 29/06
                                                              370/229

(Continued)

*Primary Examiner* — Shawnchoy Rahman
(74) *Attorney, Agent, or Firm* — Nixon & Vanderhye PC

(57) ABSTRACT

A streaming one time Pad cipher using rotating ports for data encryption uses a One Time Pad (OTP) to establish multiple secure point-to-point connections. This can be used to implement a streaming OTP point-to-point firewall, virtual private network or other communications facility for communicating secure information across one or more insecure networks.

21 Claims, 12 Drawing Sheets

Related U.S. Application Data a continuation-in-part of application No. 14/107,158, filed on Dec. 16, 2013, now Pat. No. 9,584,313.

(60) Provisional application No. 61/864,383, filed on Aug. 9, 2013.

(56) References Cited

U.S. PATENT DOCUMENTS

| | | | |
|---|---|---|---|
| 6,763,327 B1* | 7/2004 | Songer | G06F 9/45504 703/20 |
| 7,096,368 B2* | 8/2006 | Kouznetsov | H04L 69/329 713/189 |
| 2009/0224884 A1* | 9/2009 | Tuttle | H04W 12/033 340/10.1 |
| 2016/0080276 A1* | 3/2016 | Basilier | H04L 12/4641 370/235 |
| 2019/0205317 A1* | 7/2019 | Tobias | G06F 3/0487 |

\* cited by examiner

STREAMING ONE TIME PAD VIRTUAL PRIVATE NETWORK

CROSS-REFERENCE TO RELATED APPLICATIONS

This application is a divisional of application Ser. No. 15/445,132 filed 28 Feb. 2017; which is a continuation-in-part of U.S. patent application Ser. No. 14/692,841 filed Apr. 22, 2015; which is a continuation-in-part of U.S. patent application Ser. No. 14/107,158 filed Dec. 16, 2013; which claims benefit of U.S. Provisional Application No. 61/864,383 filed Aug. 9, 2013. Application Ser. No. 15/445,132 is also a continuation-in-part of U.S. patent application Ser. No. 14/107,158 filed Dec. 16, 2013; which claims benefit of U.S. Provisional Application No. 61/864,383 filed Aug. 9, 2013. Application Ser. No. 15/445,132 is also a continuation-in-part of U.S. patent application Ser. No. 15/409,151 filed Jan. 18, 2017; which is a continuation of U.S. patent application Ser. No. 14/107,158 filed Dec. 16, 2013; which claims benefit of U.S. Provisional Application No. 61/864,383 filed Aug. 9, 2013. Application Ser. No. 15/445,132 is also a continuation-in-part of U.S. patent application Ser. No. 15/411,618 filed Jan. 20, 2017; which is a continuation of U.S. patent application Ser. No. 14/692,841 filed Apr. 22, 2015; which is a continuation-in-part of U.S. patent application Ser. No. 14/107,158 filed Dec. 16, 2013; which claims benefit of U.S. Provisional Application No. 61/864,383 filed Aug. 9, 2013. The disclosures of the prior applications are incorporated in their entirety by reference.

STATEMENT REGARDING FEDERALLY SPONSORED RESEARCH OR DEVELOPMENT

None.

FIELD

The technology herein relates to computer security, and more particularly to secure methods for transferring data electronically across a network. Still more particularly, the technology herein relates to data encryption techniques using rotating ports, one time Pads and/or block and/or stream ciphers.

BACKGROUND

Data encryption is known that uses streaming ciphers, block ciphers or one time Pads. Streaming and block ciphers are widely used even though they are not mathematically provable to be 100% secure. These can use symmetric or asymmetric (or public key) cryptography. The keys are typically of a fixed size and may be static. A calculation is done one each side to encrypt or decrypt the data. In a typical symmetric key approach, a shared secret on each side of the transmission channel is used. For example, the same shared secret key is used to encrypt a message before transmission and decrypt the received encrypted message. In a public key scenario, a sender uses the public key of a public-key and private-key pair to encrypt a message. The receiver uses the corresponding private key to decrypt the message. In the symmetric key approach, security is provided by the secrecy of the shared key and the difficulty of decrypting the message without it. Security is provided in the asymmetric key approach because it is generally computationally infeasible to derive the private key from the public key.

One-time Pads ("OTP's") were invented early on in the 20th century and are the only provably secure cryptosystem. In a manual one time Pad scenario, the sender has a pad of paper on which is written randomly chosen key letters. The key is the same size as the message. In one implementation, the sender adds one key letter to each plaintext letter to produce cipher text, and never repeat the key letters. For example, assume the message is "YES" and the Pad letters are "CMG". You add Y (25) to C (3) to get B (26+3=2 modulo 26), or E (5) to M (13) to get R (18). The sender then destroys the paper. The receiver reverses the process using his pad of paper (the encryption is thus symmetric), and then burns the key letters when he is done.

Because the key is the same size as the plaintext, every possible plaintext is equally likely and it is impossible for an attacker to tell when the correct decryption has been derived. See e.g., Schneier, *Secrets and Lies: Digital Security In a Networked World* (Wiley Publishing, 2000).

Some streaming ciphers attempt to approximate a pseudo One Time Pad (OTP) operation. In such scenarios, the transmitter and receiver independently but synchronously generate the same key. Because the keys are calculated and not truly random, they can sometimes be cracked (the key is insecure because it is calculated) but may provide adequate security depending on the context and cryptographic algorithms used. Streaming cipher calculations can sometimes take considerably more time than a single add or exclusive OR operation as is used in certain one time Pad implementations, but this calculation time can have different impacts depending on context.

Even in systems that are still secure now, history has shown exploits will be found over time. Accordingly further improvements are desirable.

Applicant has previously made improvements to such technology. See e.g., commonly-assigned U.S. Pat. No. 8,995,652, US20150043730, and WO2015021477A1, which describe apparatus and methods for generating one-time-Pads and using one-time-Pads to protect and encrypt information. These prior patent applications and patents are expressly incorporated herein by reference as if expressly set forth.

BRIEF DESCRIPTION OF THE DRAWINGS

Example non-limiting embodiments and implementations will be better and more completely understood by referring to the following detailed description in conjunction with the drawings of which.

DETAILED DESCRIPTION

Figure 1:
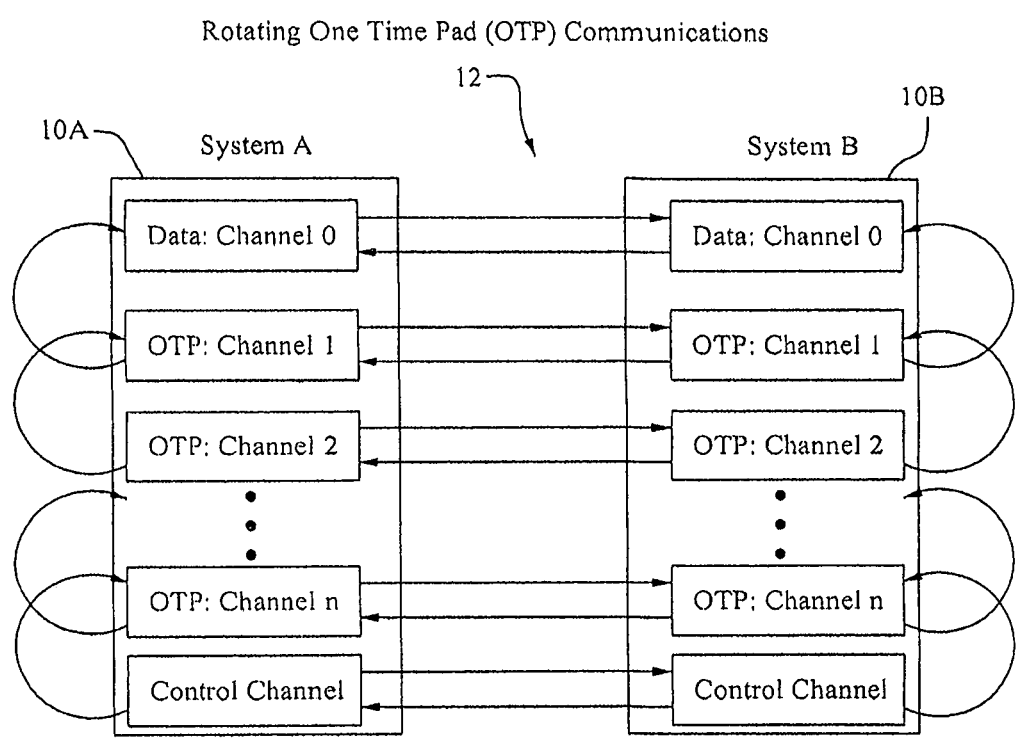
FIG. 1 is a block diagram of example rotating one time Pad (OTP) communications system.

In one example non-limiting embodiment, the onetime Pad is generated on one side with random data and sent to the other side. If the transmission is secure, there is no method in cryptography to attack this and it is proven impossible to crack. Through forward caching of OTP data, latency increases are kept to an absolute minimum as the XOR for encryption and decryption can be a single CPU cycle instruction on most systems. For example, in some example implementations, the OTP data can be streamed continually from the transmitter to the receiver, or the OTP data could be generated elsewhere and streamed to both the transmitter and the receiver. The OTP data can be transmitted at any data rate including a data rate that is lower than the message transmission data rate. For example, the OTP data could be conveyed securely over an entirely separate communications channel such as human courier, digital control channel, or any other conveying means. Upon generation and transmission, the OTP data can be cached in a memory and used as needed to encrypt/decrypt as needed. The transmitter and receiver continually maintain indices of which parts of the OTP data have already been used and which parts have not yet been used and are thus the next ones to use. In example non-limiting implementations, each item (e.g., character, hexadecimal value, etc.) in the OTP stream is used only once to encrypt a single item (e.g., character, hexadecimal value) using a simple XOR. After being used to encrypt an item in the message, an OTP item is then discarded in the example non-limited implementation and is not used again for encrypting any more message data.

As stated above, non-limiting embodiments provide mathematically provable secure methods for transferring data electronically across a network.

A One Time Pad securely encrypts data transmissions. The OTP may be sent on a separate data communication channel encrypted likewise. In one example implementation, there is one public key channel that uses a known public key (asymmetric) encryption method but does not have a fixed port for communication and hence is hard to intercept. Such an encrypted channel is used to transmit an OTP. In another non-limiting approach, the channel is encrypted and decrypted using a shared secret key. Any current state of the art conventional encryption can be used for this channel.

Non-limiting embodiments use N number of channels allowing the OTP to be generated randomly by the sender with no predefined scheme and sent to the receiver securely. There is no calculation to discover hence this is a pure OTP operation. The communication channels also rotate their physical and/or logical ports periodically. This makes intercepting and studying the stream very difficult. It also obfuscates the public key channel from the OTP encrypted channels hiding the potentially vulnerable public key channel. It also opens the possibility of sending the data channel, OTP channel(s) and the public key channel across different networks creating a physical network access barrier.

One example non-limiting embodiment rotates which channel is responsible for sending control messages. These control messages could be cracked using current encryption techniques if they are for example in a known, repeated format. The example non-limiting embodiment moves these control messages around not just in the stream (always in different spots) and may also move the channel which they are transmitted on. Other than initial messages, these can always be transmitted across an OTP encrypted stream (not the public key channel). This could include the data/message channel(s), which is uncrackable without compromising the public key channel. Since the public key channel is sending random OTP data, that's mathematically impossible to figure out/crack for the same reason OTP is impossible to figure out. The public key channel could be sending anything and there is no pattern to the data in such an example non-limiting embodiment.

Because the example non-limiting embodiment uses a single XOR operation, latency in the transmission of data is decreased as long as a forward buffer of OTP data is maintained.

One example non-limiting embodiment uses two sets of OTP streams where a data channel is first encrypted with the OTP and then again with Symmetric or Asymmetric encryption.

The example non-limiting arrangement can be used in routers, switches, network cards, secure phone, secure video, secure wireless voice, peripheral cards or in any type of machine or system that requires high security communication transmission.

One non-limiting embodiment includes:
1. Data Message(s) To Send
2. Random number generator for creating One Time Pads (OTP)
3. OTP Encryption Function—This will do "Exclusive Or" (XOR) on blocks of data.
4. Encrypted Message
5. Message Communication Channel
6. OTP Communication Channel(s) (Can be 0 . . . *number of channels.)
7. Public Key Channel
8. Virtual port facade Example Relationships Between Components The following is an example non-limiting scenario for sending an encrypted message. First, a message for the data stream is created or obtained (1). Next, a onetime Pad is created (2) to encrypt the message with. A second onetime Pad is created (2) to encrypt the first one time Pad. Any number of one time Pad channels (6) and corresponding one time Pads (2) to encrypt the new channel can be created to increase complexity obfuscating the system. Next, communication channels are created for OTP (7) and the message channel (5). A public key channel (7) is created using an alternate, well known secure encryption technique such as a Public Key based stream cipher.

Once the message and OTP data is ready, the encryption function (3) is used. This method combines the data for a given channel with the OTP from its assigned OTP channel. After this is done, the message is ready to be transmitted to the receiver. Once the message is received after transmission, the OTP from the assigned channel is again run through the de(en)cryption function (3) to decrypt the message. (This is the way the one time Pad operates—the same Pad is symmetrically used to encrypt and decrypt the message.) After that, the decrypted information is ready to be used either as the next channel's OTP or as a decrypted message.

As a precursor to any data being sent, one OTP block is sent to the receiving side as a "primer" Pad. This primer allows the streaming process to start in an encrypted manner In this case, a public key channel (7) is used to send the initial prime OTP block. Optionally this block can be delivered manually.

To further obfuscate communications in non-limiting embodiments, the OTP channel(s) (6), message channel (5) and the public key channel (7) should have their port rotate/change periodically. The port change can be logical and/or physical. This will make intercepting data more difficult. Changing physical ports that ride on differing private networks further increases the security of the system.

In all cases in the non-limiting embodiments, OTP information should be cached on both sides and pre-fetched ahead of messages when possible. When data is sent, this allows it to flow with the least possible latency.

Lastly, virtual ports can be employed (8) in some non-limiting embodiments to allow the protocol to run at the network layer. This allows an entire system to be protected without having to embed the solution in software.

How It Works

When requiring encryption of information across a data network, you first start with the message stream to be encrypted. Next, you will need a random character generator for creating a streaming One Time Pad (OTP). While this can be done in software with sufficient measures taken to ensure randomness, it is encouraged to use a proven hardware random value generator. This has two advantages: 1) the randomness is better (truly random or close to truly random); and 2) processing is offloaded, reducing CPU load. Once a random number generation method is selected, a Pad method is created to generate OTPs. Each OTP in the example non-limiting implementation matches the size of the message being encrypted. The OTP will then be sliced into buffers in an array. The sizes (lengths) of the chunks resulting from the slicing process match the sizes (lengths) of the messages to be encrypted and decrypted, and different messages can have different sizes (lengths). This allows chunks of data to be processed and operated on. One chunk of random OTP data for each chunk of message will be run through an Exclusive Or (XOR) operation to be encrypted. To decrypt information with an OTP, the encrypted data and the OTP are run through the XOR calculation reversing the first XOR. In other non-limiting embodiments, transformations other than XOR can be used.

To ensure an OTP itself is not sent clear across the network, it is also encrypted in the same manner with another OTP. To further obfuscate the data, multiple OTP channels can be used. Each channel will be assigned the task of encrypting another channel. In this scheme, there can be a symmetrical number of channels including one public key or other channel that uses an existing well known encryption method. This channel may for example use conventional asymmetric PK encryption or symmetric shared key encryption. Subsequent OTP channels are encrypted using the prior (or other) channel's OTP or the OTP from channel. N−1 where N is the "current" channel.

The public key channel if present uses more conventional block or streaming cipher methods of encryption such as asymmetrical public key or other cryptography. In some non-limiting embodiments, such a channel is encrypted, secured or otherwise protected by technology other than public key cryptography. As discussed above, symmetric key cryptography based on a shared secret could also be used. As another example, one non-limiting implementation uses physical security (e.g., a dedicated communications path not easily accessible or otherwise not subject to interception or eavesdropping by an attacker). In other example non-limiting implementations, a symmetric stream cipher is used to protect this channel. This channel can send control messages as well as one OTP stream, and so can be termed a "control channel." After initiation, control messages can be sent across any OTP channel. The responsibility of control messages can also be rotated, further obfuscating the protocol. In one embodiment, the encrypted messages can be sent across any OTP or the data channel except Channel 0—the control channel. The system could also be implemented with only a message/data and a public or symmetric key channel. This may not under some circumstances be sufficiently complex to increase security past the public or symmetric key channel's implementation, but may nevertheless provide improvements. For example, latency improvements will still be evident even in a two channel system with pre-fetching of OTP information. The data itself will also be uncrackable unless the public or symmetric key channel is compromised.

Once the number of OTP channels is decided, each OTP stream will be assigned to a given communication channel. At this stage, the non-limiting example protocol will dictate moving channel ports periodically including the public or symmetric key channel. This adds one more layer of obfuscation and makes it difficult if not impossible to intercept data. This makes even the aforementioned two channel implementation more secure than a standard one channel block or streaming cipher.

To get the process started, an initial OTP chunk is delivered using a secure method. This can be done with the public or symmetric key channel, a separate secure transmission protocol (such as SSH) or manually using removable storage. This non-limiting first step is referred to as priming the system. There are many ways to do this that are fairly secure.

Here is a summary of example non-limiting steps to running the system:

1—OTP is generated for at least one channel (N number of other OTP channels may be used.)

2—The OTP, data and public or symmetric key channel are paired where one OTP channel along with the OTP transmitted on the public or symmetric key channel encrypts another with a final channel encrypting the actual data.

3—Data and OTP information is broken into chunks of a predefined size for array storage.

4—The initial chunk that encrypts one OTP channel is sent using a secure mechanism to prime the system. This can be done through the public or symmetric key channel, another secure network channel, physically primed with removable media or any other method imaginable to get the first chunk on both sides securely.

5—Each piece of data is combined with its assigned OTP data.

6—The output of this calculation (encrypted data) is then transmitted across the network to the receiver.

7—The receiver runs an XOR calculation on its data chunk and the assigned OTP chunk producing the unencrypted message.

8—Communication channel ports (physical, logical or both) are rotated periodically. This removes the opportunity to intercept and inspect data of a given stream.

9—Optionally the public or symmetric key channel cipher can be changed periodically. This further obfuscates messages as there is no longer one encryption mechanism to decipher by a potential cracker.

Using this protocol at the network layer, this entire scheme can be fronted by a virtual port backed up by network facing ports that are either physical, logical or both. This allows the system to behave with software as expected but lets the protocol do something very different in the network. This method could also be expended out to network equipment.

Example Non-Limiting Way to Make

To make the preferred embodiment system, you can use two computers, at least one computer or other data or other communications network, an existing encryption mechanism for the public or symmetric key channel and a reliable random number generator. The two computing resources may have connectivity across one or more computer networks. Next, a public or symmetric key channel is established across the network. Next, the random number generator is used to create one or more one time Pads streams. Next, a series of communication channels are established to send both messages and OTP information across the network. The public or symmetric key channel is responsible for one of the OTP streams to be sent. Each OTP stream and the OTP in the public or symmetric key channel is assigned to encrypt another channel (including the data/message channel). At this point, each channel encrypts its data by taking its assigned OTP and calculating the product using an Exclusive Or (XOR) operation. That encrypted data is then transmitted to the receiving computer, where the process is reversed. The encrypted data is combined with the assigned OTP data, producing the unencrypted information. Communication channel ports and control channel ciphers can be rotated periodically to obscure the information in the network.

Data to be securely delivered, a network, two computers, random number generator and an existing encryption mechanism for a control channel are all used in one non-limiting arrangement. The OTP communication channels are not necessary as the system could be built with simply a data and control or other encrypted channel. In this arrangement, however, security would not be as robust. Adding one or more OTP channels increases the complexity of the communication, which adds obfuscation. The system can also be constructed without rotating the ports but again this removes misdirection and obfuscation leading to a less secure solution.

A VPN network or secure tunnel could be added to the already encrypted control channel to add another layer of encryption. This may increase the security of the control channel. The more layers of encryption added, the more secure that channel's communications will potentially be.

FIG. 1 shows an example non-limiting system for rotating OTP communications. The example system includes two systems (10A and 10B) coupled together with n communications channels (12). An encrypted control or other channel can be used to exchange the OTP key data, and there can be multiple data communications channels used to communicate different encrypted parts of the message. Because each item in the securely exchanged OTP is used only once to encrypt a single item in the message and is then discarded, the system is provably secure so long as the channel used to exchange the OTP is secure.

OTP data received is sent to and used by another communications channel This can be arranged in any way and does not necessarily need to go to the next channel. This should also be shuffled in some non-limiting embodiments as long as the OTP indices and data indices align. The OTP data received is sent to and used by another channel. This can be arranged in any way and does not necessarily need to go to the next channel. This could also be shuffled as long as the index's OTP and data indices align. Each channel will encrypt another. Each channel will buffer its OTP data to a set amount during idle time. This will allow the data channel to send its information unencumbered. A control channel that uses an existing well known block or streaming cipher mechanism (similar to ssh Transport Layer Encryption or public or symmetric key cryptography) can be used to carry one of the OTP streams. Channels may also be rotated. This can happen in many ways depending on how channels are defined and established. For instance, in a pure TCP/IP scheme with a single physical port, channels can represent logical ports. Ports will be changed periodically but only the two sides will know about this. Internally, the system may refer to the channel numbers. In this way, the physical mechanism each channel uses is unknown and can change.

In a more complex scheme, we may have N number of physical channels that traverse differing or different networks. For example, in one implementation, some channels might be transmitted over the Internet, other channels might be transmitted using a wide area, public data or cellular telephone network, and still other channels might be transmitted using a physically secure landline, direct line of sight electromagnetic communication, through physical transportation of a memory storage medium, or by any other means. The channels could actually change networks as well as ports further obfuscating the data being sent. In this way, you could send the data across the public Internet while securely sending the Pads on one or more private line networks. As long as Pad data is pre-cached sufficiently, latency will not suffer.

Which channel provides an OTP for which side should also be configurable in some non-limiting implementations. Since all OTP channels contain random streams of characters, the OTP channel pairs can also be rotated as long as the OTP and stream indices line up on rotation. Random rotation offsets make it very hard to tell what the new port/channel/socket is for and doesn't allow an attacker to "time up" the port rotations. Cipher algorithms and/or keys in the public or symmetric key channel can also be rotated making decrypting the cipher at any moment more difficult. Lastly, the control messages can be sent across any channel and rotated periodically. This makes tracking control messages more difficult.

Figure 2:
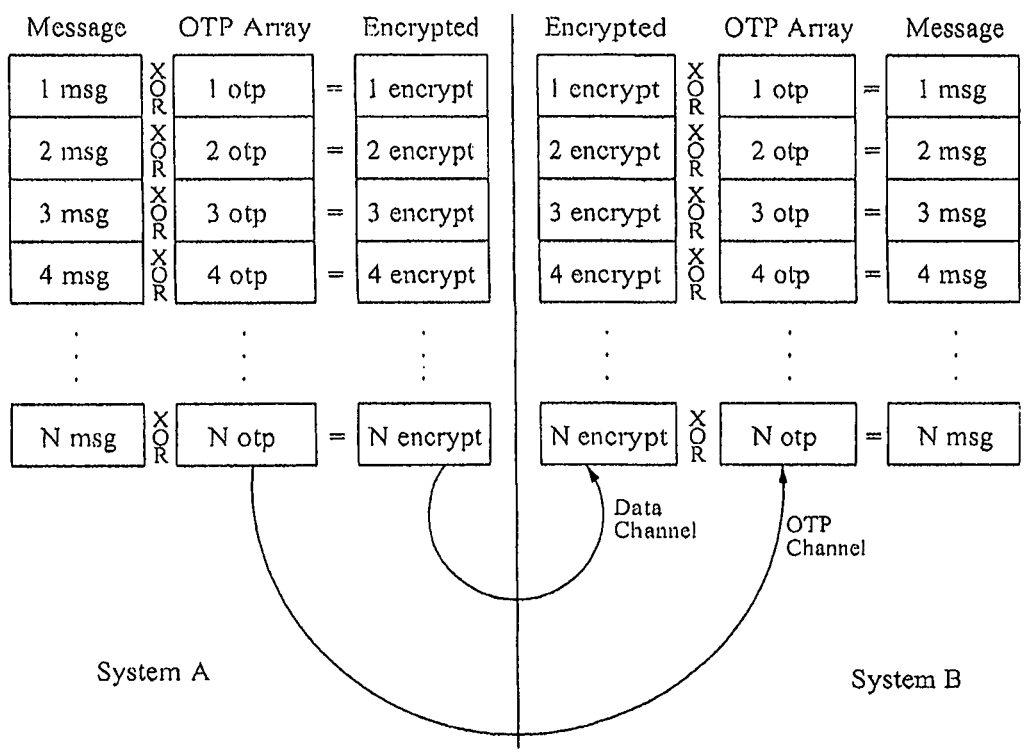
FIG. 2 shows example message encryption.

FIG. 2 shows an example of the data broken into an array and encrypted using a One Time Pad. Data message block 1 is encrypted (e.g., XOR) with a first OTP block to produce cipher text which is transmitted. Upon receipt, the cipher text is decrypted (e.g., XOR) using the same OTP block to recover the original data message block. Similarly, a second OTP block is used to encrypt a second data message block, a third OTP block is used to encrypt a third data message block, and so on.

Figure 3:
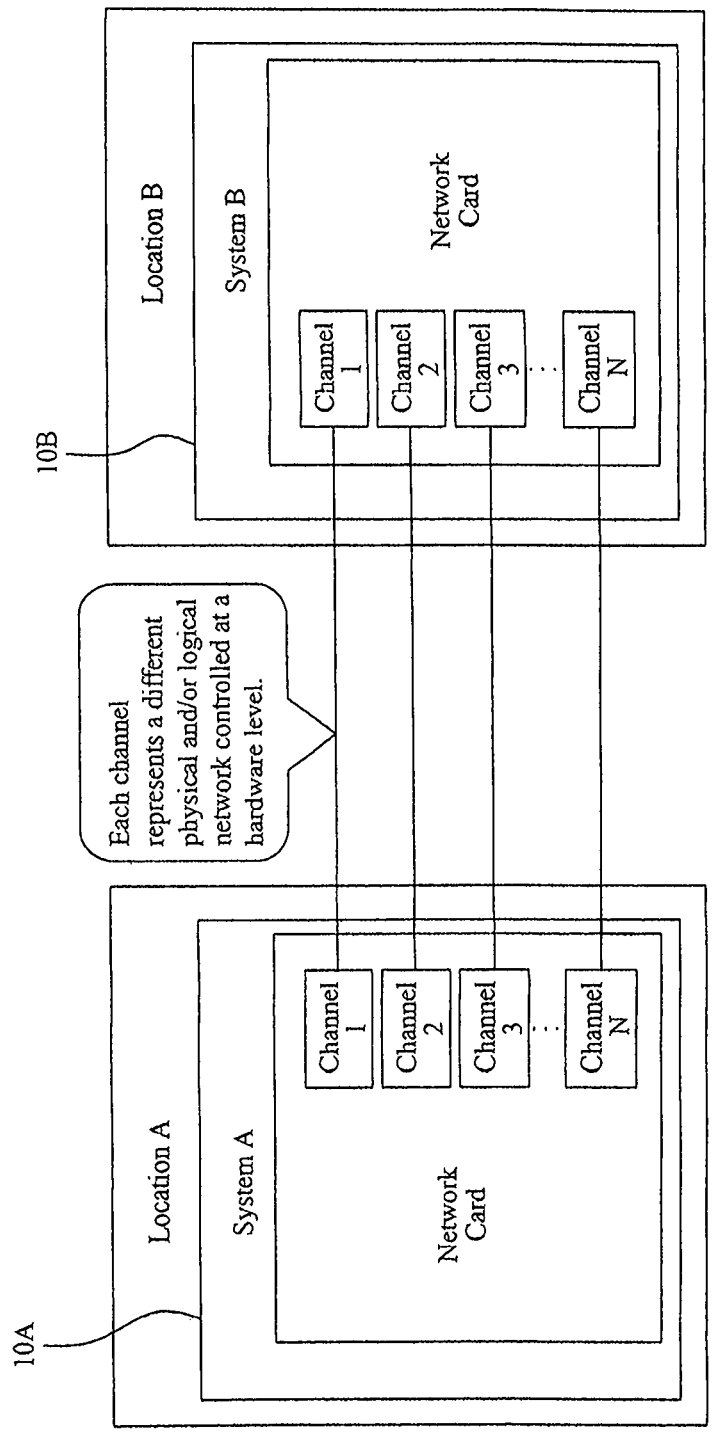
FIG. 3 is a block diagram showing example use of different channels communicating between two systems to provide one time Pad messaging.

FIG. 3 shows a hardware implementation and how system 10A at location A can transmit to system 10B at location B, over a variety of different channels. In this case, each channel represents a different physical and/or logical network controlled at a hardware level. Such different channels can be defined using the same or different network cards, and can be wireless, wired or a combination. Some non-limiting embodiments could also employ a second (or n number) of secondary networks. This allows sending of OTP data across completely separate physical networks. This would be an excellent idea for the control channel for instance. In this way, access to multiple physical networks would be required to compromise the system. Using VPN networks would have a similar effect to using separate physical networks.

The virtual interface is not required as the system can be embedded directly in an app or other transportable or downloadable software. Using a virtual interface allows any application using the interfaces virtual ports to be protected without modification.

When multiple networks are used, any channel can go across any network and the system will behave the same. It is also possible to configure the system with only a control and data/message channel and the system will also work in a similar manner Lastly, any channel sending OTP data can be assigned to any other communication requiring OTP encryption. As long as chunks are aligned, the OTP streams can be interchanged (since they are random numbers) and the system will still behave.

How to Use

There are at least four primary ways to use this application: 1) Embed the solution directly in an application; 2) provide a proxy application that works like a tunnel; 3) create a virtual port layer directly injecting the solution in the network layer; or 4) embed the protocol directly in hardware (network card, switch, router, transport gear, . . . ). Further variations and combinations are also possible including solutions that may cross multiple network media including but not limited to copper, fiber, wireless, radio and satellite. In all cases, the message data is transmitted across the network in an uncrackable or otherwise secure format.

For example usage 1, the user would take libraries created for the solution and implement the functions and classes replacing any socket connections with the class implementation. Such instructions could be stored in non-transitory storage and be executed by a processor. The actual workings of the encryption are abstracted from the user in this case. Configuration will set initial ports, number of OTP channels and possibly configure the encryption used for the command channel.

In example usage 2, the process is configured and a listen port established to allow processes to connect through. Again, the implementation details are extracted out. Configuration is similar to option 1.

In the third example utilization, a virtual port is created to proxy the process(es) to. In this non-limiting configuration, the protocol becomes a module that can be plugged into the network layer of the operating system. This configuration completely abstracts the implementation details away from the end user. In this case, any network application can utilize the functionality by simply binding to the virtual port. Configuration of the system is the same as 1 and 2.

In the fourth example utilization, all functionality is embedded in hardware or in a combination of hardware and software. This can be done directly in a chip such as a custom ASIC, in an e-prom or other storage device, in a gate array or digital signal processor, or any other type of hardware implementation imaginable. In this implementation, the OS is completely abstracted from the inner-workings of the protocol. It is possible to allow configuration as needed. This implementation would likely use multiple physical networks. In this implementation, the solution can be executed at lower network layers.

Additionally: This technology could be embedded in hardware into a chip. In this way, it could be used in routers, switches, network cards, peripheral cards or in any type of machine or system that requires high security communication transmission.

The example non-limiting solution can be used in routers, switches, network cards, secure phone, secure video, secure wireless voice, peripheral cards or in any type of machine or system that requires high security communication transmission.

Figure 4:
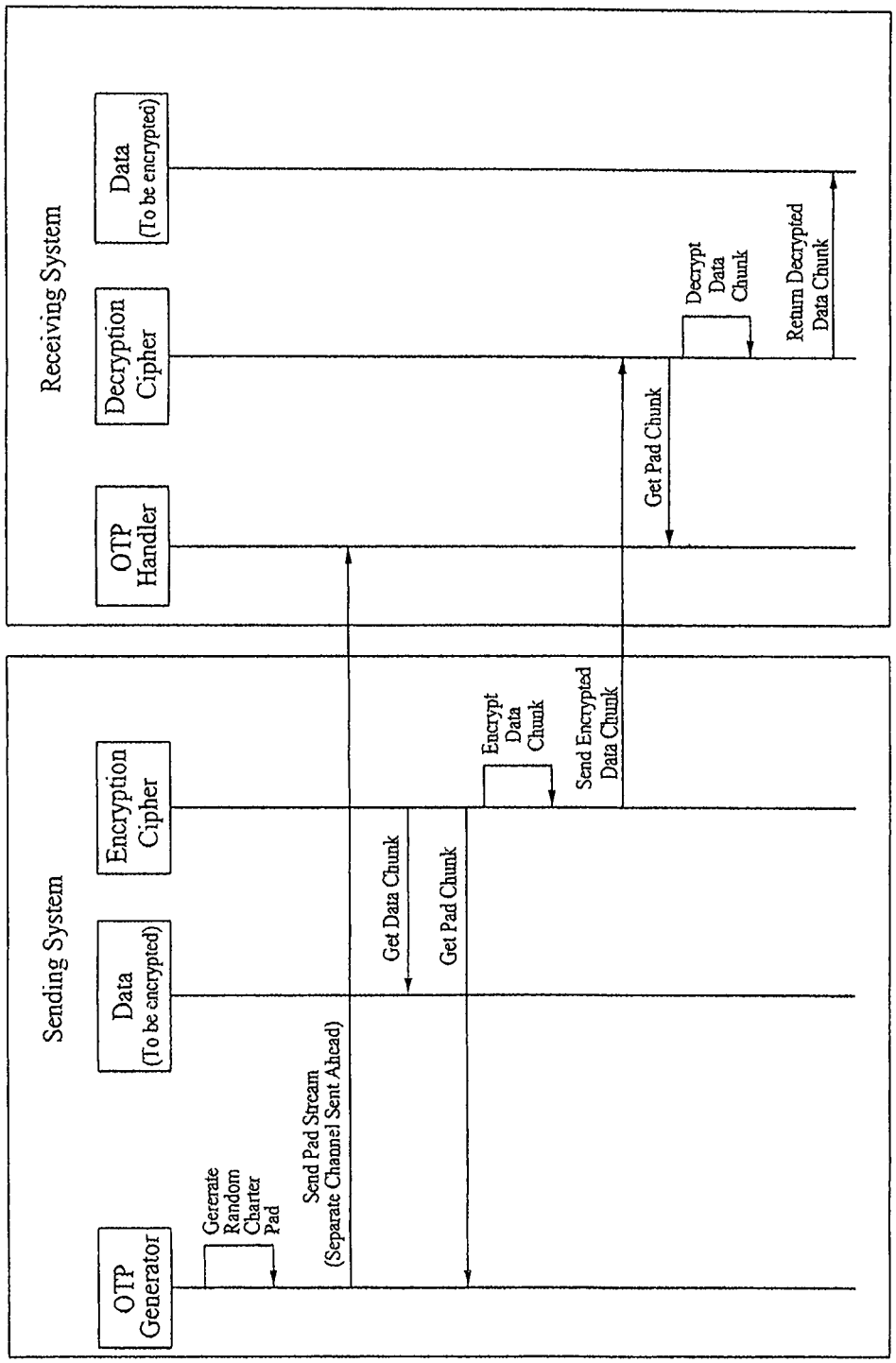
FIG. 4 shows an example non-limiting communications protocol.

In one example implementation shown in FIG. 4, an OTP generator generated a random "charter" Pad that is sent via a serial Pad stream to the OTP handler on the receive side. Then, encryption block on the sending side gets a data chunk as well as a corresponding Pad chunk, encrypts the data chunk with the Pad chunk, and sends the encrypted data chunk to the receive side. On the receive side, the data is received by an OTP handler and is then decrypted using the exchanged OTP.

Figure 5:
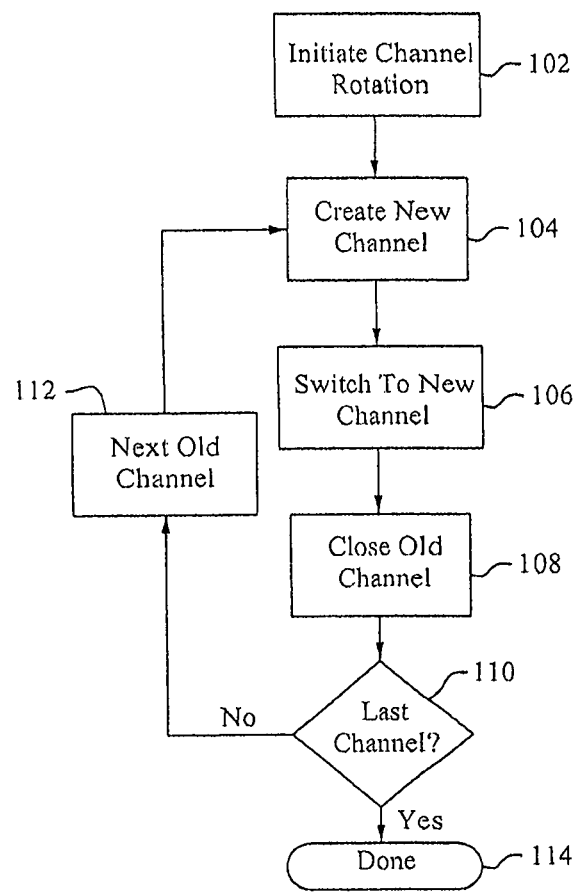
FIG. 5 is an example non-limiting flowchart.

FIG. 5 shows a flowchart of an example non-limiting process. The example system initiates a channel rotation (102) and creates a new channel (104). The system then switches to the new channel (106), closes the old channel (108) and then determines if this is the last channel (110). If not, the system gets the next old channel (112) and creates that as a new channel (104). Otherwise, the process ends (114).

Figure 6:
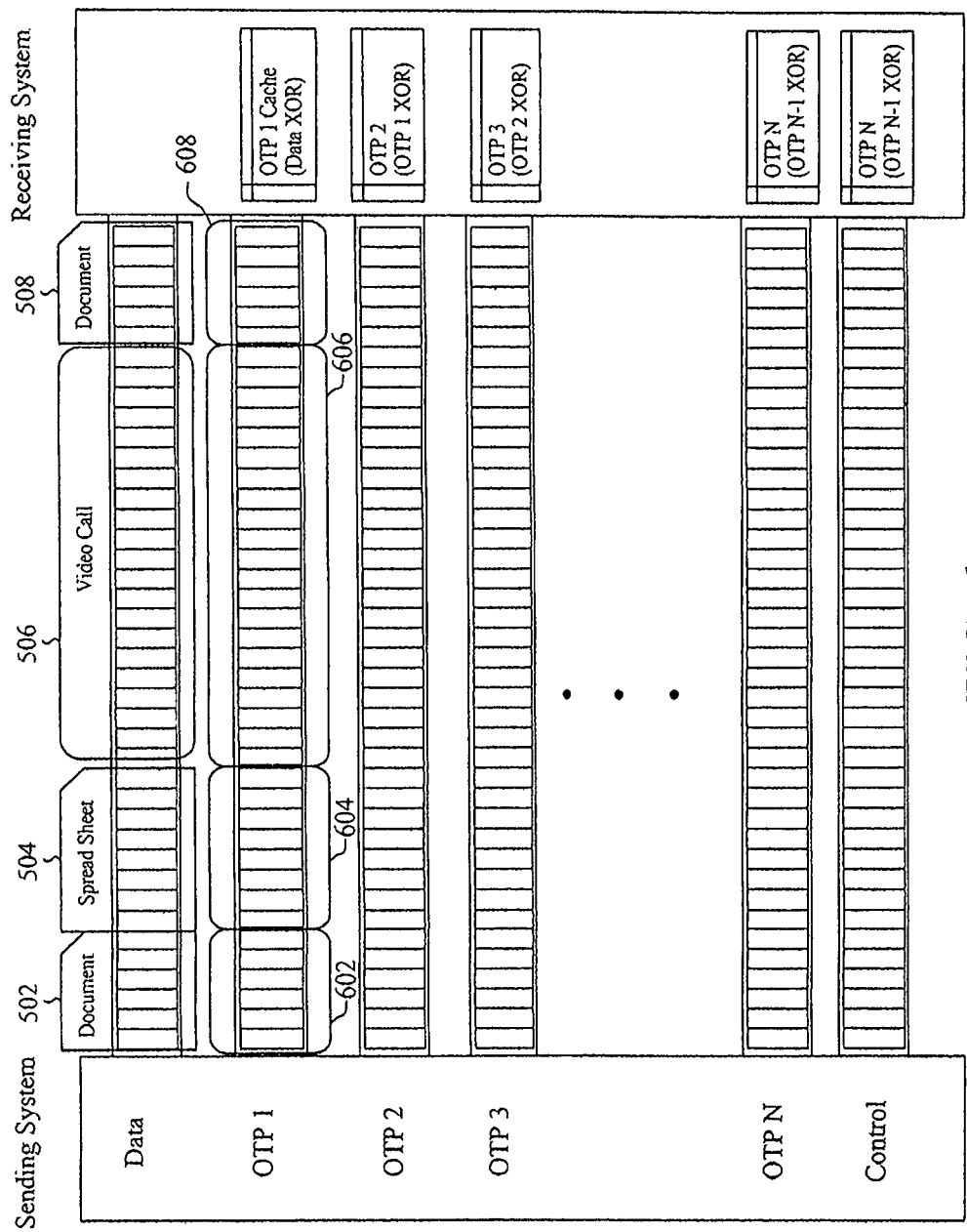
FIG. 6 shows an example of how one time Pads can be allocated to and used to encrypt messages.

FIG. 6 shows an example simplified allocation of one time Pads to messages. In this example, the sending system wishes to send data to the receiving system, namely a document 502, a spread sheet 504, a video call 506 and a further document 508. A first one time Pad OTP1 is used to encrypt the data items 502, 504, 506 and 508, which a first OTP portion 602 being used to encrypt document 502, and second OTP portion 604 being used to encrypt spreadsheet 504, a third OTP portion 606 being used to encrypt video call 506, and a fourth OTP portion 608 being used to encrypt data 508. In the example shown, the encryption is performed by simply XORing binary data elements of OTP 1 with corresponding binary data of data items 502, 504, 506 and 508. Thus, OTP portion 602 is used only to XOR with document 502 of equal length as OTP portion 602; OTP portion 604 is used only to XOR with spreadsheet 504 of equal length as OTP portion 604; and so on.

Meanwhile, in the example shown, OTP1 XORed with the data to obtain OTP2, OTP2 XORed with further data can be used to obtain OTP3, and so on through OTPN. OTPN can be transmitted over the control channel. The order of the encryption shown demonstrates the concepts. Actual order of what encrypts what can vary and can actually be changed for further obfuscation on message block boundaries. Since the data in this particular example is encrypted with ports and channels rotated, it becomes near impossible to intercept and decrypt. Physical security can be used to secure physical access. Adding more channels increases the difficulty (exponentially) of intercepting and recovering the messages. Using different physical networks controlled by different carriers and moving channel ports both physical and logical, it becomes unrealistically complex to crack. An attacker would need N number of spies to gain access to each physical network and to then be able to follow the port/network rotation as well as cipher encryption changes. The example non-limiting technique shown in FIG. 6 thus is effective to hide the control channel. Even with logical virtual networks or simple ports, the complexity makes it impossible to follow. Preferably at least three channels are used (data, top and control) to take advantage of this scheme but more channels can be used if desired.

As discussed above, it is also possible provide one or more decoy channels that appear to an attacker to be a control or OTP channel but which actually transmit meaningless and/or misleading data. Such decoy channels do not need to be encrypted but can rotate ports and may transmit for example random character arrays or other data that mimics encrypted data and/or the one time Pad. Such decoy channels can cause an attacker to waste time. Any security system can be cracked given enough time and effort, but if the messages are of the type that lose their meaning or significance with the passage of time (e.g., control information controlling a real time system; tactical instructions to coordinate a human effort; perishable news or intelligence information; etc.), then an attack (e.g., "brute force") that takes longer to be successful than the duration over which the message information remains valuable will likely be rendered worthless.

Figure 7:
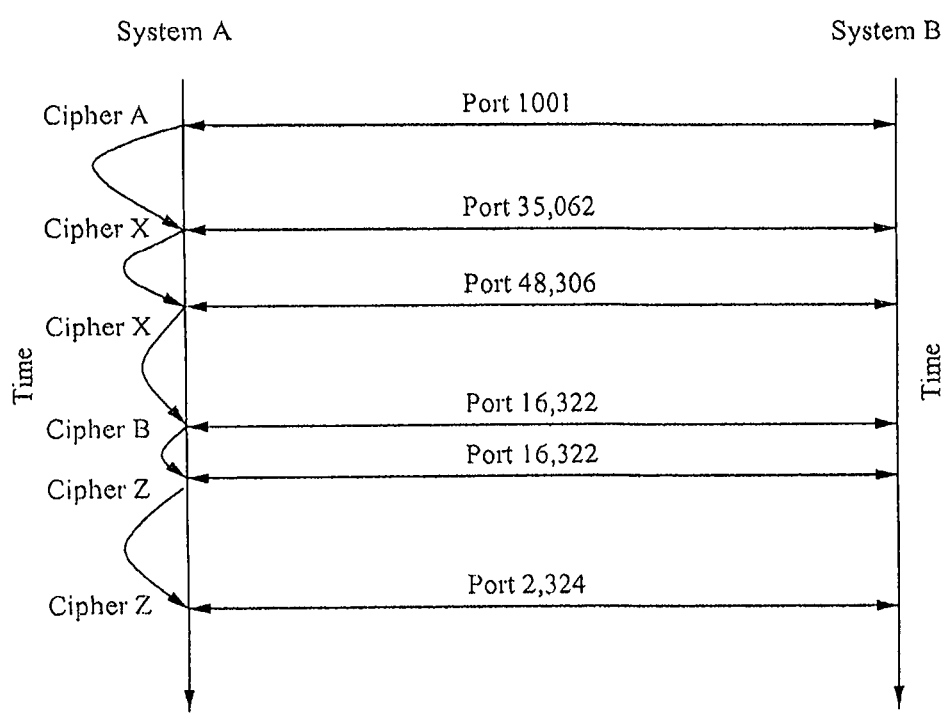
FIG. 7 shows a further non-limiting embodiment.

FIG. 7 shows an additional non-limiting embodiment that uses a block or stream cipher instead of a one time Pad and also employs port and cipher rotation. In this diagram, the left-hand axis descending from the top to the bottom of the page is the time axis. Hence, events near the top of the page happen before events near the bottom of the page. In this example non-limiting embodiment, a block cipher algorithm in the public or symmetric key channel is rotated to make recorded decryption much more difficult. Rotating the port for an existing block cipher can be used to create a simple but effective mechanism for thwarting current interception, inspection and decryption techniques (Carnivore type techniques). The interception in these cases permits the ports (and cipher algorithm(s)) to remain static, and are compatible with any of a number of different conventional cipher algorithms such as known block ciphers including but not limited to Lucifer, IDEA, RCS, AES, Blowfish, etc.

In more detail, FIG. 7 shows an example embodiment that uses a block cipher with only port and cipher rotation. Time is randomized so that different events happen at different random or pseudo-random (and thus unpredictable) times. Not all things are changed at all times (random change). Furthermore, such use of block ciphers may be bi-directional and asynchronous (in contrast, an example non-limiting OTP mechanism may be unidirectional and synchronous).

As shown in FIG. 7, System A may transmit a block cipher A to System B over port 1001. System A may then rotate from cipher A to cipher X, which system A uses to transmits messages. The timing of port and cipher changes are unpredictable by an attacker. System A may continue to transmit additional data using cipher X to system B over port 48,306 at a still later unpredictable time. System A may switch from cipher X to block cipher B which system A uses to transmit data to system B over port 16,322 at a still later unpredictable time. System A later switches from cipher B to cipher Z which system A uses to transmit data to system B continuing use port 16,322. System A may continue to transmit data using cipher Z while switching the port to 2,324.

Alternatively, since the communications channels in FIG. 7 are bidirectional, any of the new cipher derivations shown could be performed by System B rather than System A. For example, System B could initiate the change to cipher X, system A could do the same for cipher B, system B could initiate the change to cipher Z and so on. Additionally, some of the random, pseudo-random or unpredictable timings of the transmissions shown could be determined by system A whereas such timings for other events shown could be determined by system B, or both could independently derive timings that appear to be random or pseudo-random to an attacker but which are actually deterministic based on a shared secret.

Example Non-Limiting Streaming Firewall

Figure 8:
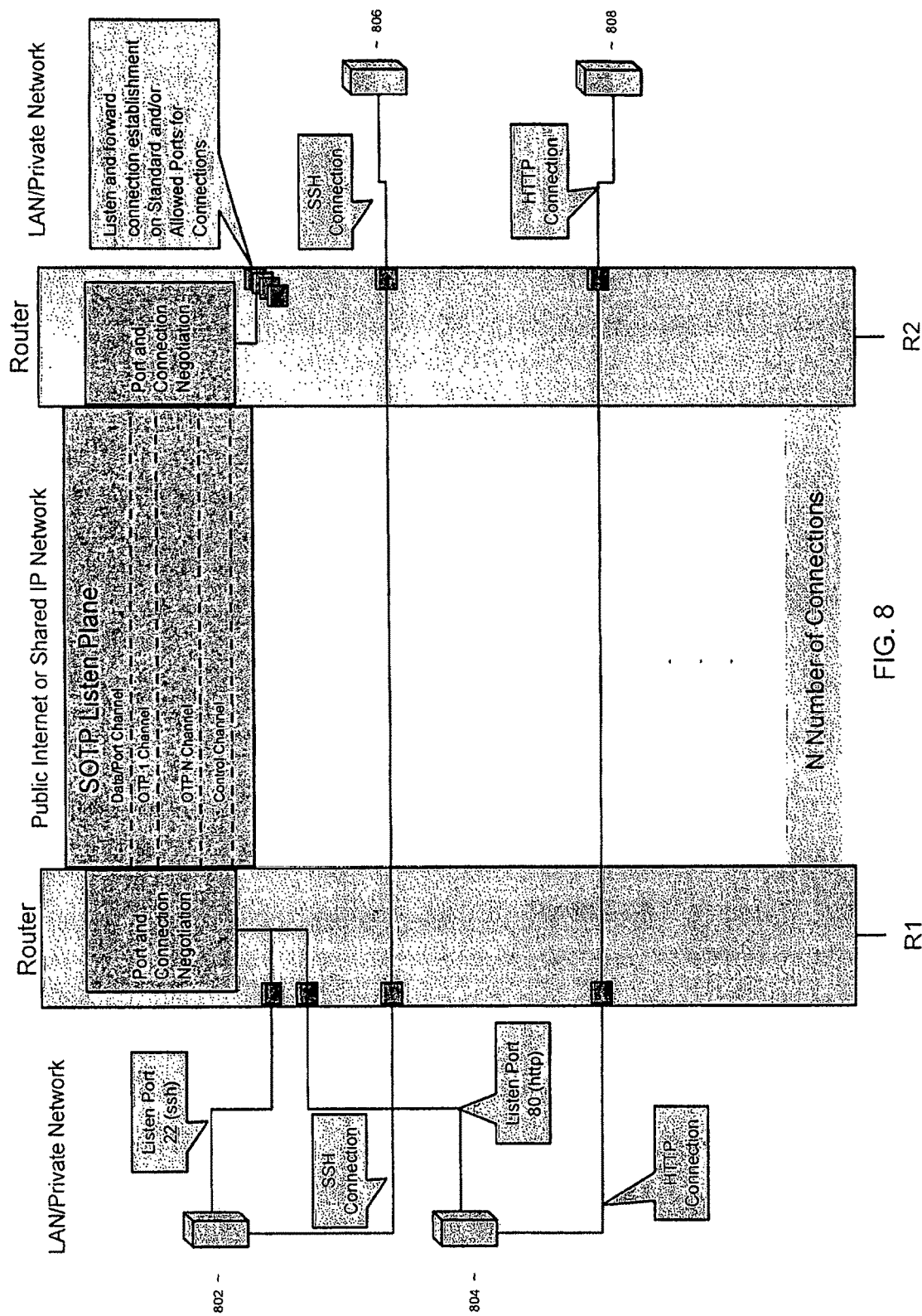
FIGS. 8 and 9 show an example non-limiting streaming firewall.
Figure 9:
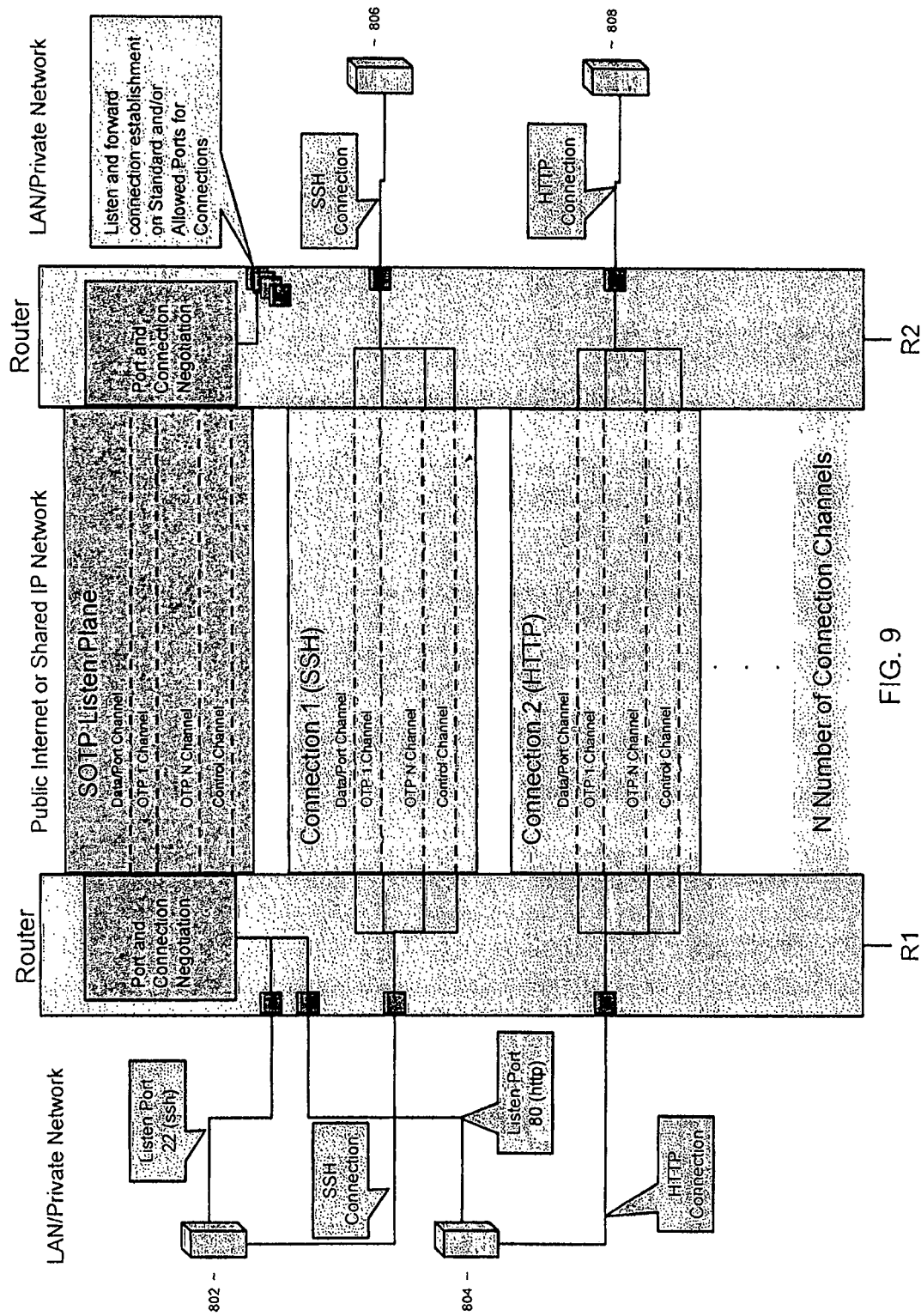

FIGS. 8 and 9 show an example non-limiting streaming one time Pad (OTP) point-to-point (PTP) firewall. Such a firewall can be used for example to provide a secure virtual private network between two communications points—in this particular embodiment two routers R1, R2 but which in other embodiments could be any two devices capable of communicating with one another.

Briefly, the FIGS. 8 and 9 streaming firewall embodiment uses the SOTP protocol above to secure a channel to listen for connection requests on either side. The requests themselves will be forwarded to the other side but encrypted without the standard ports being visible. This makes attacking the well know ports across the public Internet, shared IP network or cloud network services impossible. There will then be an SOTP created to facilitate the established connection. On either side inside the LAN boundaries, the arrangement looks like a standard connection meaning that no changes are required to existing protocols or procedures ("plug and play"). Across the WAN, the non-limiting embodiment exposes none of the standard ports. All communications are encrypted using the SOTP protocol in the non-limiting embodiment.

In more detail, FIG. 8 shows a secure connection between two routers R1 and R2. This secure connection is used to communicate port and connection information between the two routers. This communicated port and connection information is used to establish further secure connections 1, 2, M. By using the SOTP protocol, the exposed ports used in the network for communication will be randomly chosen and periodically rotated. It will also be encrypted using an OTP making the request mathematically impossible to decipher by any potential attackers. In short, this thwarts simple Denial of Services attacks by hiding well known ports while also negating man in the middle attacks that may try to listen to the connection after establishment by listening to and garnering information from the connection establishment.

In this non-limiting embodiment, router R1 includes a processor that executes one instance of a port and configuration negotiation process, and router R2 similarly includes a further processor that executes a further instance of the port and configuration negotiation process. In this non-limiting example, the two instances of the port and configuration negotiation process communicate over a digital network such as for example a public Internet, shared IP network, cellular telephone network, or any other type of data path using the OTP protocol described above.

Thus, in the example shown, the two communicating processes establish a multi-channel secure connection referred to as the "SOTP Listen Plane". This multi-channel connection includes a data/port channel, OTP channels 1-N, and a control channel, as described above. This secure connection is used to securely communicate additional connection information used to establish additional secure connections. In particular, the instances of the port and connection negotiation process listen and forward connection establishment information on standard or allowed ports for connection. Thus for example, a device 802 on the left side of the drawings may use the SOTP listen plane to establish a secure (e.g., SSH) connection with a device 806 on the right side of the drawing (see FIG. 9). Device 802 may communicate using a standard listen port 22, but the port and connection negotiation process remaps this standard port into a virtual secure connection that in turn includes multiple channels comprising a data/port channel, OTP channels 1-N, and a control channel. Similarly, a device 804 may wish to use listen port 80 to establish an http connection with another device 808. In this non-limiting embodiment, device 804 uses the port and connection negotiation process, which maps the port 80 traffic into a virtual http connection with device 808 using an additional associated data/port channel, OTP 1-N channels, and a control channel M such connection channels can be established, where M is any integer. In other embodiments, only the secure connection between the port and connection negotiation processes is implemented using the OTP protocol, and other secure connections are implemented using conventional protocols such as for example SSL, virtual private networking, or any other secure or insecure point-to-point networking protocol.

In another embodiment, the connection or ephemeral port on the exposed side of the router is rotated periodically. This rotation may also be done with a new or different physical path in lieu of or in addition to the ephemeral port substitution for stronger security. Such technologies can hide the actual socket/point-to-point channels. In a still further embodiment, the ephemeral port is changed in conjunction with a new physical path assignment(s). These measures can thwart man in the middle attacks and not allow a port to be snooped. Coordination of the port rotation is in the disclosed example embodiment provided across the SOTP Listen Plane. This insures that rotation messages are not intercepted.

Figure 10A:
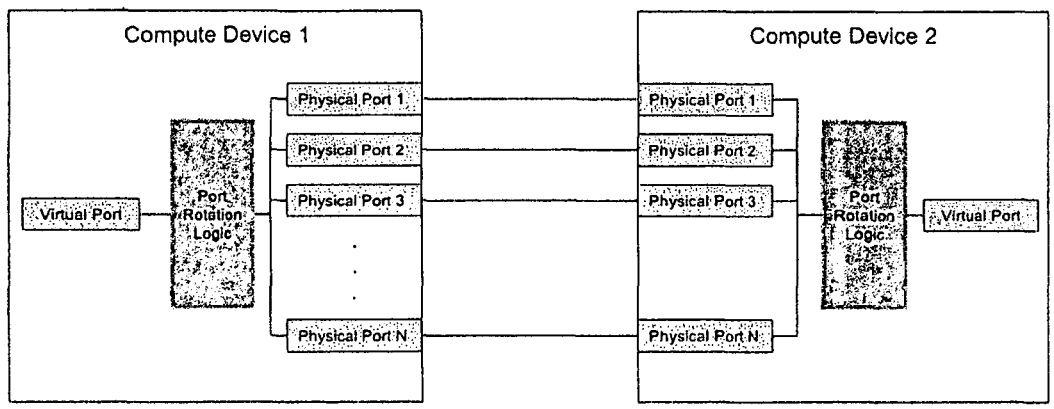
FIGS. 10A and 10B show an example more detailed port rotation non-limiting embodiment.
Figure 10B:
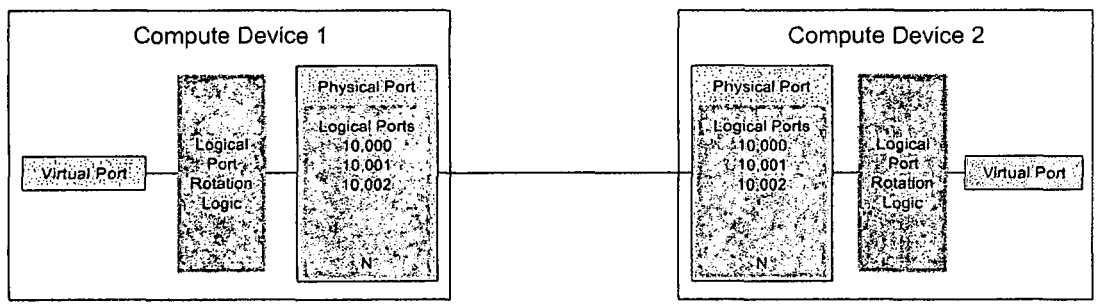

FIGS. 10A-10B show an additional non-limiting embodiment providing randomly rotating ports. In the FIG. 10A non-limiting example, virtual ports on the network layer within each of computing devices 1 and 2 are coupled to port rotation logic that multiplexes data communicated to/from the virtual ports over N randomly rotated physical ports. There can be any number of physical ports 1-N where N can be any integer. The physical ports could be for example different channels, different physical communication paths, different sockets, etc. As one example, a first physical port could comprise an Ethernet port, a second physical port could comprise a wireless (e.g., GSM cellular, Bluetooth, WiFi, radio, etc.) port, a third physical port could comprise a TCP/IP port, a fourth physical port could comprise a USB port, etc. In some contexts, "physical port" is defined as an interface that accepts a connector, but the term "physical port" has been broadened to also include wireless connections that do not use a physical connector such as USB, Ethernet or HDMI but rather interface wirelessly.

In the FIG. 10B non-limiting example, virtual ports on the network layer within each of computing devices 1 and 2 are coupled to port rotation logic that multiplexes data communicated to/from the virtual ports over N randomly rotated logical ports. The physical ports could be for example different channels, different physical communication paths, etc. The logical ports could be different IP or other addresses or ranges, tunnels, or MPLS point-to-point. In either case, the virtual ports can be tunnel ports such as a linux tun1, tun2, tun3 type virtual ports. Some virtual and/or physical ports can be encrypted and/or rely on physical security. A series of these virtual ports with a routing protocol can be used to create a VPN solution.

Figure 11:
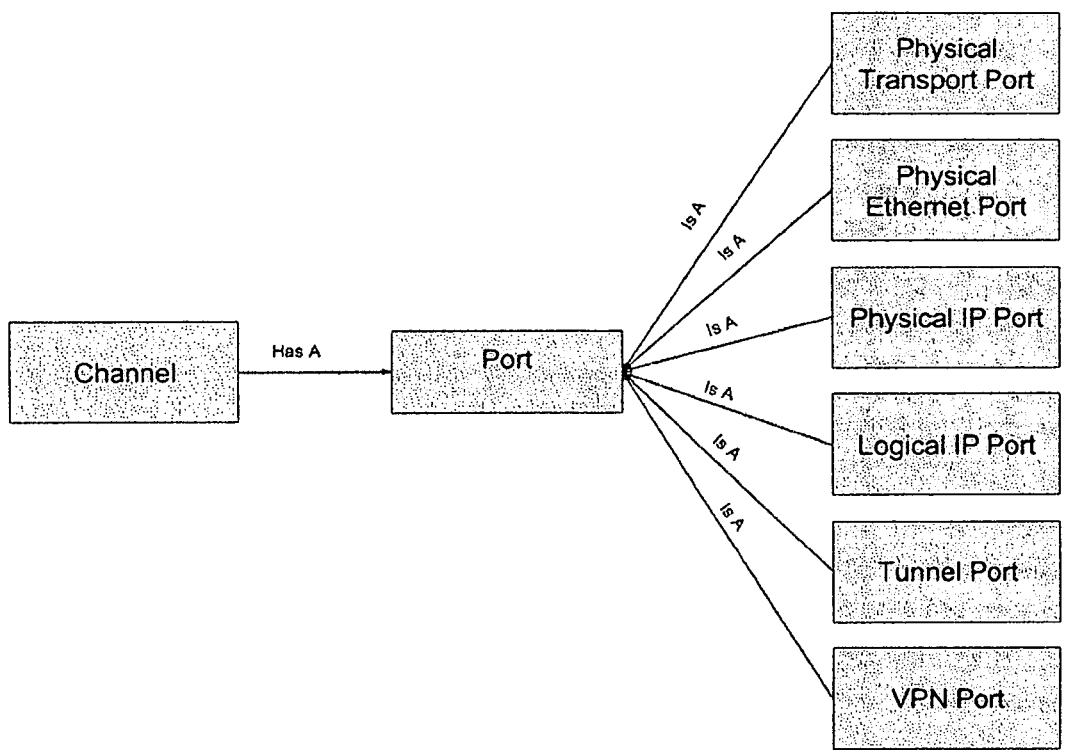
FIG. 11 shows example non-limiting port rotation through a variety of different example physical layers.

FIG. 11 shows yet another embodiment in which some of the ports are physical ports and some of the ports are logical ports. For example, the FIG. 11 non-limiting embodiment uses a physical transport port and a physical Ethernet port. It also uses a logical IP port, a tunnel port and a VPN port. Such mixed embodiments that rotate through different physical and logical ports can provide additional security because an attacker would need to be able to eavesdrop of each kind of port in order to intercept or spoof a message and provides extra obfuscation in the Moving Target Defense (MTD) scheme. For example, an attacker who is able to eavesdrop on different TCP/IP ports would need to have physical access to a computing device in order to also eavesdrop on USB port communications.

In each of the embodiments shown in FIGS. 10A, 10B and 11, the rotation logic facades the physical or logical port rotation from the virtual ports so that port rotation (be it between physical ports, logical ports or both) is abstracted and hidden from user applications, operating system(s) and other software executing on the computing device(s). The FIGS. 10A and 10B and FIG. 11 embodiments abstract the protocol away from existing processes, allowing it to be used "invisibly" in an existing system. A series of these virtual ports with a routing protocol can be used to create a VPN solution.

For example, the FIG. 10B implementation uses logical ports with a single physical port to hide the data in the network. This technique can also be combined with the physical port implementation to further hide the data. Inside the computing device, any process can connect to the virtual port and it will work like any other network port. The process is none the wiser that the physical and/or logical ports are being switched, changed or rotated periodically or at random or pseudorandom times. Such a process does not need to be modified, specially adapted or aware of the physical and/or logical port rotation. This allows any process to use the protocol without having to change the way it operates. Applications (even legacy ones) that are not designed for secure communications can be made secure in this way. Additionally, secure communications protocols such as encryption and tunneling that an application already uses can be layered on top of the additional security provided by logical and/or physical port rotation. This technique thus adds an abstraction layer to working with an existing process.

In the logical FIG. 10B implementation, listen/accept sockets used to connect to the new logical ports can be closed immediately after connection. This stops them from being detected by port scans—which makes this protocol nearly impossible to detect in the network. Moreover, the socket that would be detectable by a port scan is opened and closed in sub-second time. If eavesdropping is detected on a given port, the system discontinues using that port. Only one connection is allowed. If it does not complete the protocol cycle complete with a shared secret, rotation is reset and a new port is selected for rotation. A shared secret is also used between the two devices to coordinate port rotation e.g., via an encrypted control channel.

This technique is close to impervious. It is likely to be nearly impossible to cheat without compromising one side or the other.

In such systems, it is possible to get a shared secret from a shared system and/or re-synchronization and recovery from a 3rd system. Such a third system allows repair from catastrophic failure or to get around an eavesdropper when the eavesdropper is detected. Such a third system would may also use STOP such as disclosed in U.S. Provisional Application No. 62/444,166 filed Jan. 9, 2017, incorporated herein by reference. The third system could be referred to as a Broker system as shown for example in such copending commonly-assigned provisional application.

Figure 12:
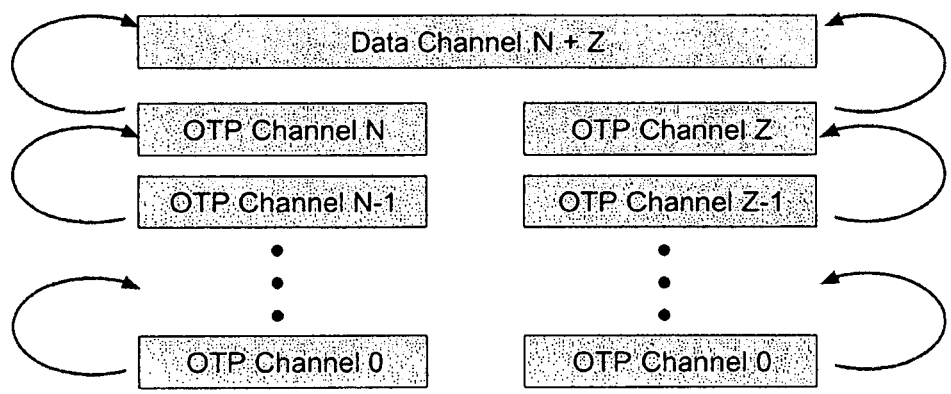
FIG. 12 shows an example non-limiting configuration in which two or more (both or more than one) sets of OTP channels are used to double-encrypt a further channel carrying data and/or system messages.

Example Non-Limiting Transmission of Two Sets of OTP Channels with Both Encrypting the Data FIG. 12 shows an example non-limiting configuration in which two or more (both or more than one) sets of OTP channels are used to double-encrypt a further channel carrying data and/or system messages. In this example, the N and Z OTP's from channel N, N−1, etc. and channel Z, Z−1, etc., are both used to encrypt a data channel. These N and Z channels can be swapped periodically to further obfuscate the data. By taking these steps, brute force encryption of the (channel 0) zero OTP channel's symmetric or asymmetric encryption becomes exceedingly difficult as, even if both sets of channels can be discovered and aligned correctly, there is no data to readily test against. This arrangement also preserves latency and speed at the expense of network bandwidth.

In this particular non-limiting example, channel 0 is the "first" or initial OTP channel and will ONLY carry OTP messages. Any of the subsequent channels can carry systems messages (or Data for that matter). Data and/or system messages can be moved to and from any channel with the exception of Channel 0.

Although two OTP streams (N channel and Z channel) are shown, any number (for example, 3 or 4) of OTP streams can be used to triple, quadruple or otherwise encrypt the data channel.

One example non-limiting embodiment thus uses two sets of OTP streams where a data channel is first encrypted with the OTP and then again with Symmetric or Asymmetric encryption.

Rotating One Time Pad (OTP) Communications with Further Encryption of Channel N

Figure 13:
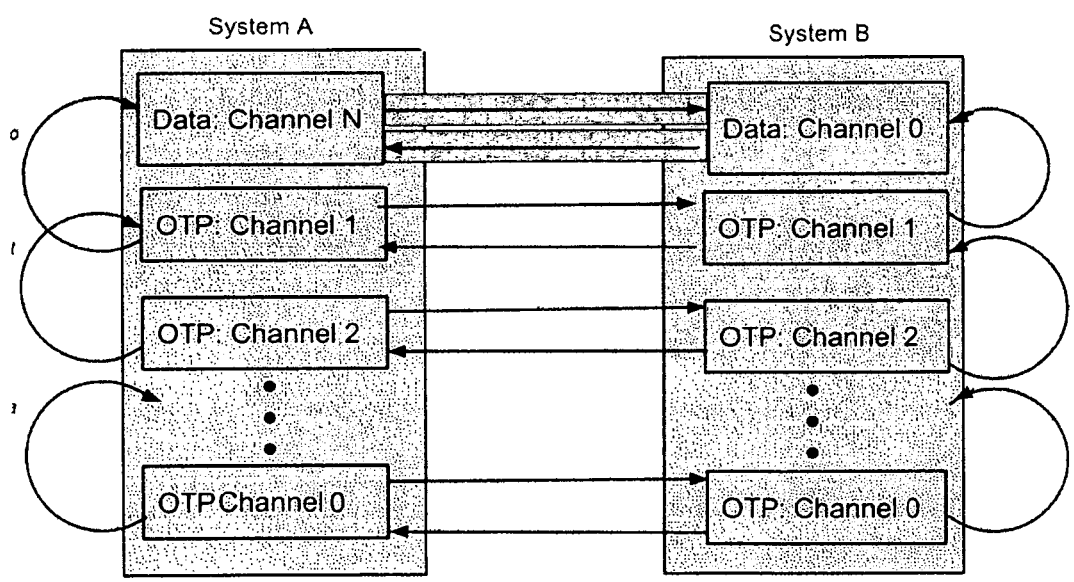
FIG. 13 shows a still further embodiment providing a rotating OTP communications with further encryption of channel. N.

FIG. 13 shows a still further embodiment providing a rotating OTP communications with further encryption of channel. N. In this embodiment, the top two pipes between System A Channel N and System B channel 0 represent another layer of standard synchronous or asynchronous encryption such as RSA asymmetric public key cryptography or AES symmetric block cipher cryptography. Performing this extra encryption leaves no known data to test against so that, even if all of the channels are discovered and aligned, a brute force attack against channel 0's standard encryption will have nothing known to test against for success. This approach gains security at the cost of increased latency.

In this non-limiting embodiment, the OTP data received is sent to and used by another channel. This can be arranged in any way and does not necessarily need to go to the next channel. This could also be shuffled or rotated as long as the OTP indexes and data indexes align. Each channel will encrypt another. Each channel will buffer its OTP data to a set amount during idle time. This will allow the data channel to send its information unencumbered. Channel 0 uses existing well known synchronous or asynchronous encryption, carrying the initial OTP streams. To obfuscate the data, channels are rotated periodically in a random way logically and/or physically and also temporally.

While the technology herein has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

I claim:

1. A secure communications method comprising:
rotating between ports while communicating at least one data channel using said rotating ports; and
coupling said communicated data channel to at least one virtual port while facading said port rotation from said virtual port, thereby concealing said port rotation from user application(s), operating system(s) and/or other software executing on a computing device and coupled to the at least one virtual port,
wherein the method further comprises using an abstraction layer to abstract the user application(s), operating system(s) and/or other software from the port rotation.

2. The secure communications method of claim 1 further including using a series of said virtual ports to provide a virtual private network.

3. The secure communications method of claim 1 further including using plural rotating logical ports with a common physical port.

4. The secure communications method of claim 1 wherein at least one application using the virtual port does not need to be modified to make use of said port rotation.

5. The secure communications method of claim 1 wherein at least one application using the virtual port does not need to be specially adapted to make use of said port rotation.

6. The secure communications method of claim 1 wherein the rotation comprises periodically rotating logical, physical or virtual ports or wave lengths of light, frequencies of radio or electric current or another division of physical or logical communications.

7. The secure communications method of claim 1 further comprising:
using a listen/accept socket to connect a new logical port; and
closing the new logical port immediately after a connection has been established.

8. The secure communications method of claim 7 wherein the using and closing is performed in less than a second.

9. The method of claim 1 further including discontinuing use of a logical and/or physical port if/when eavesdropping is detected on said logical and/or physical port.

10. The method of claim 1 further including allowing only a single connection at a time.

11. The method of claim 1 further including using a shared secret to coordinate logical and/or physical port rotation.

12. The method of claim 11 wherein using the shared secret comprises communicating the shared secret.

13. The method of claim 12 wherein communicating the shared secret includes obtaining the shared secret from a shared system.

14. The method of claim 1 further including resynchronizing and recovering from a broker.

15. The method of claim 1 wherein the rotating comprises rotating between logical ports.

16. The method of claim 1 wherein the rotating comprises rotating between physical ports.

17. A secure communications system comprising:
a computing device configured to execute a user application(s), an operating system(s) and/or software;
a port interface that communicates at least one data channel over rotating plural ports; and
at least one virtual port coupled via said communicated data channel to the user application(s), the operating system(s) and/or the software executing on the computing device, an abstraction layer abstracting the user application(s), operating system(s) and/or software from the port rotation;
wherein said port interface facades rotation of said rotating plural ports from said virtual port, thereby concealing port rotation from the user application(s), the operating system(s) and/or the software executing on the computing device and coupled to the at least one virtual port.

18. The secure communications system of claim 17 wherein said port interface is configured to use a series of said virtual ports to provide a virtual private network.

19. The secure communications system of claim 17 wherein said port interface is configured to use plural rotating logical ports with a common physical port.

20. A secure communications system comprising:
- a computing device configured to execute a user application(s), an operating system(s) and/or software;
- a port interface that communicates at least one data channel over rotating plural ports, wherein the port interface is configured to periodically rotate logical, physical or virtual ports, optical port light wavelengths, wireless port electromagnetic frequencies, or electric currents; and
- at least one virtual port coupled via said communicated data channel to the user application(s), the operating system(s) and/or the software executing on the computing device,
- wherein said port interface facades rotation of said rotating ports from said at least one virtual port, thereby concealing port rotation from the user application(s), the operating system(s) and/or the software executing on the computing device and coupled to the at least one virtual port.

21. The secure communications system of claim 17 further comprising:
- a listen/accept socket connecting a new logical port and closing the new logical port soon after a connection has been established.

* * * * *